Jan. 16, 1934.  A. G. RAYBURN  1,943,929
ROTARY HYDRAULIC POWER TRANSMISSION
Filed July 23, 1929  5 Sheets-Sheet 2
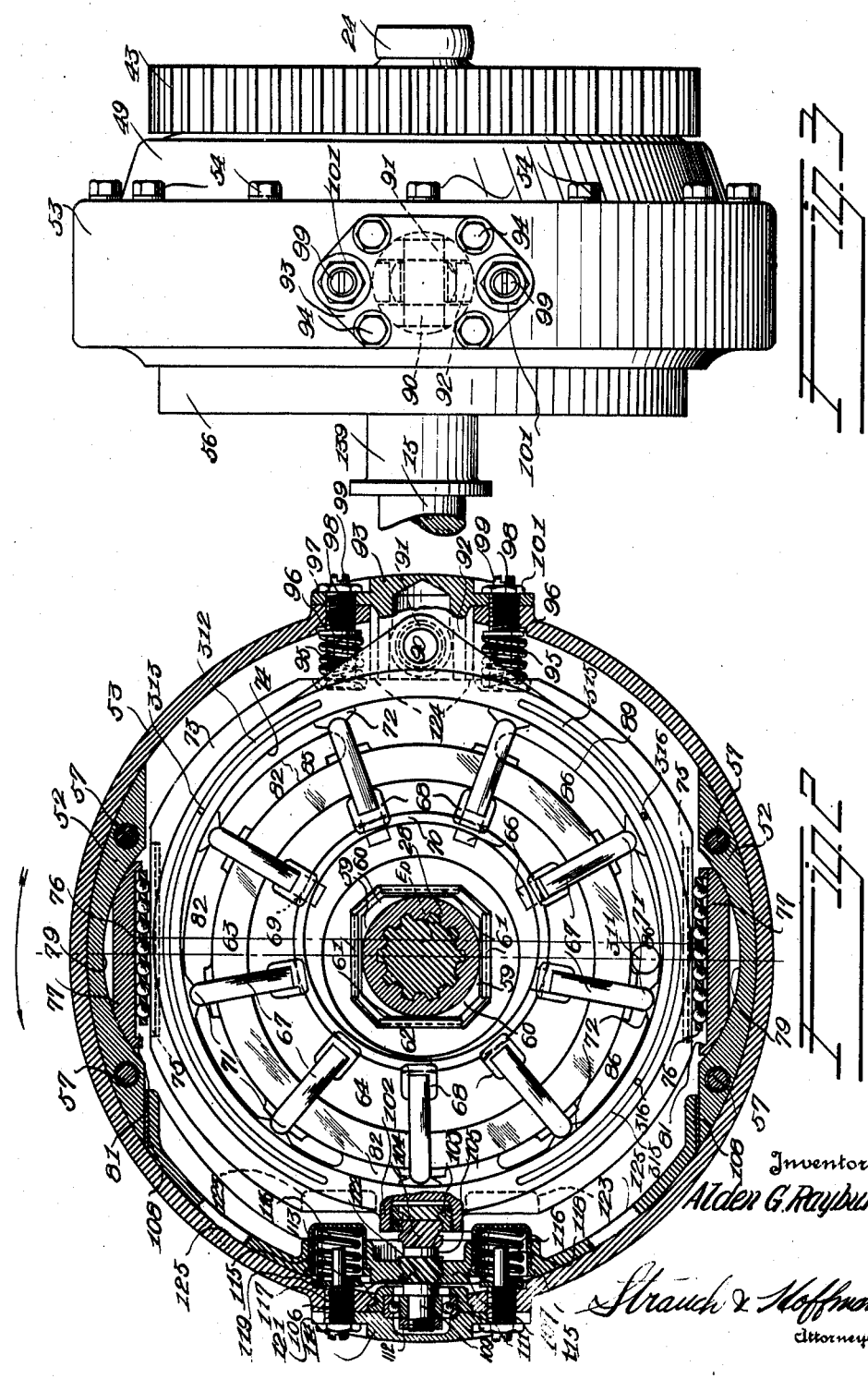
Inventor
Alden G. Rayburn
Strauch & Hoffman
Attorneys

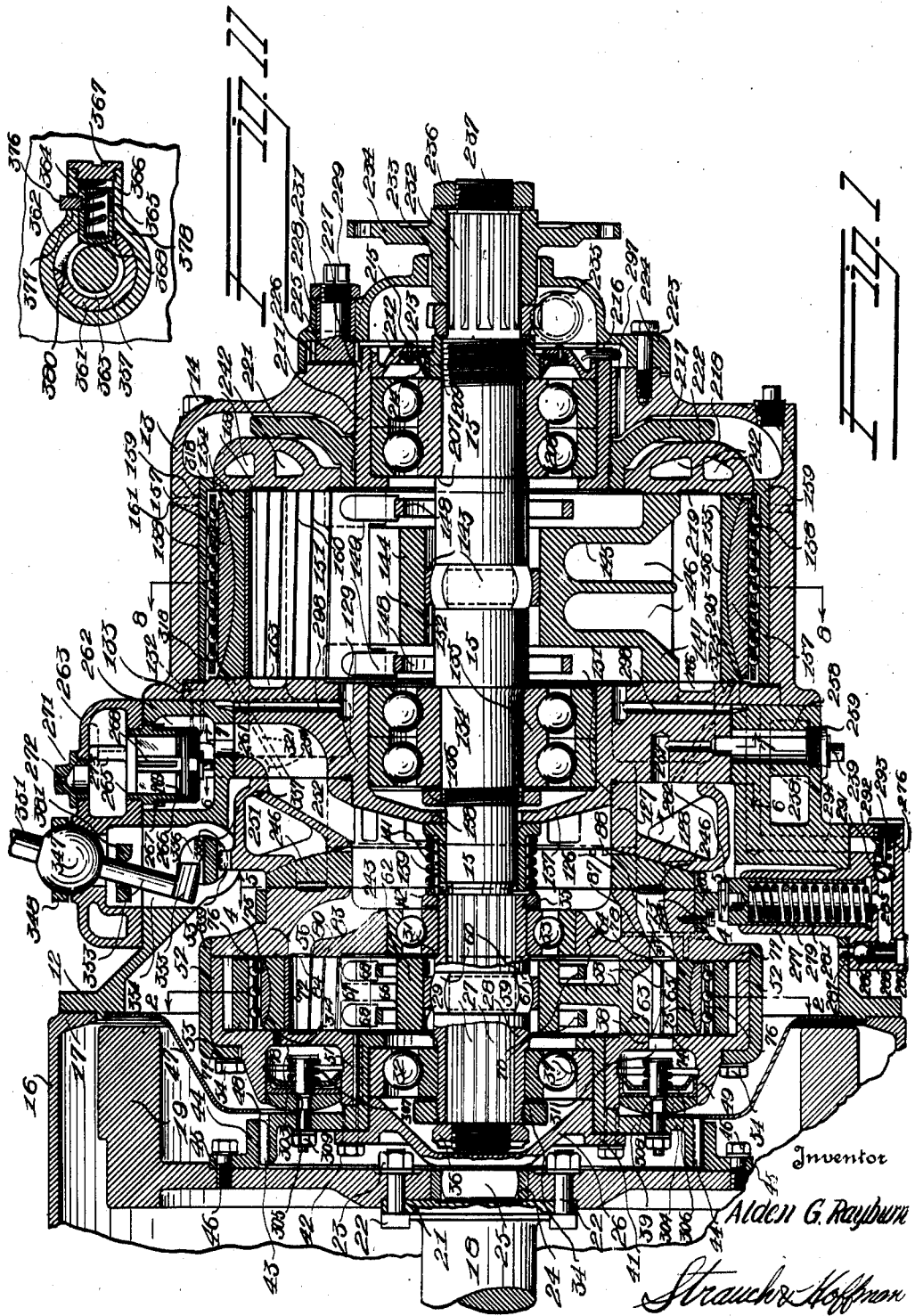

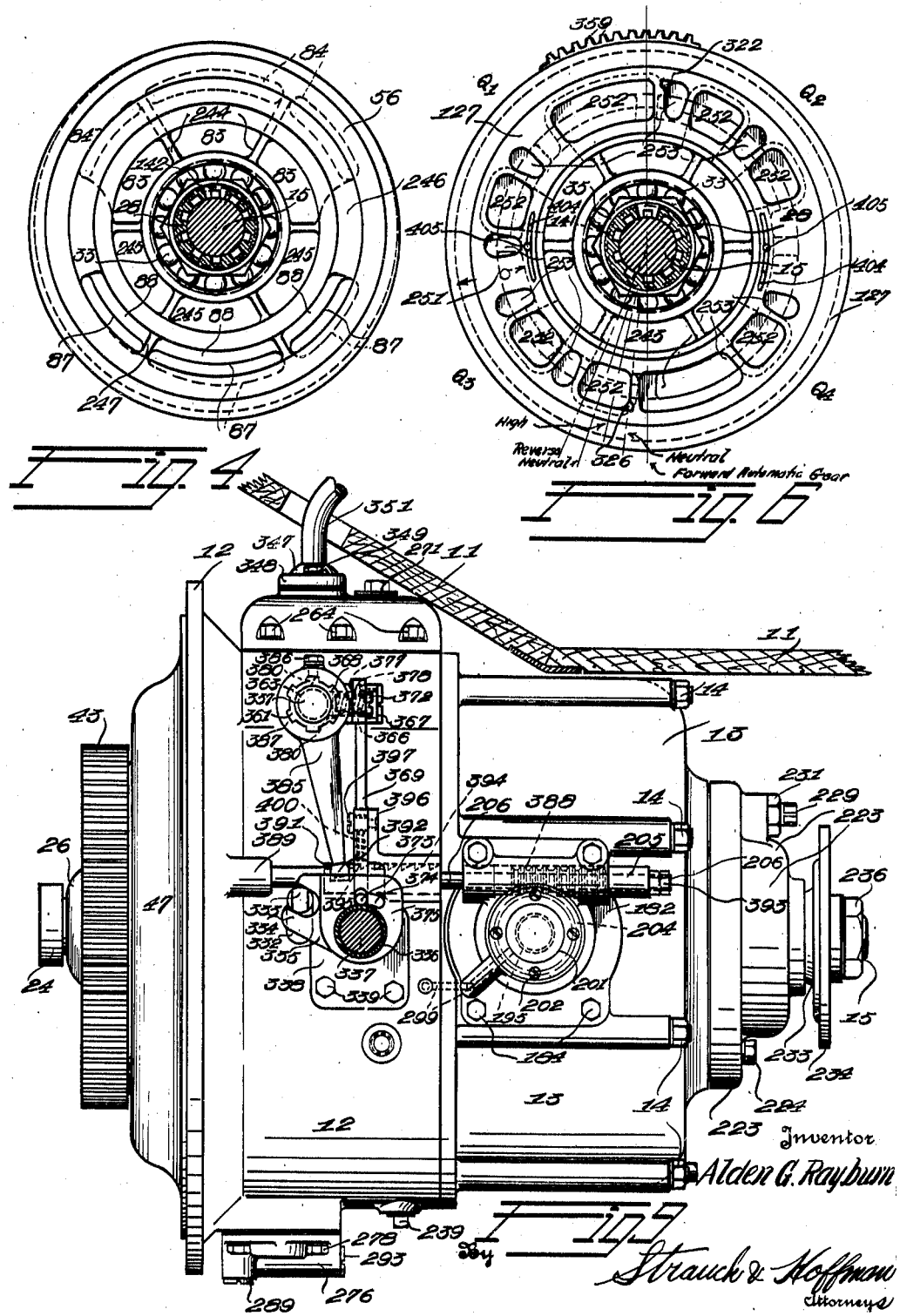

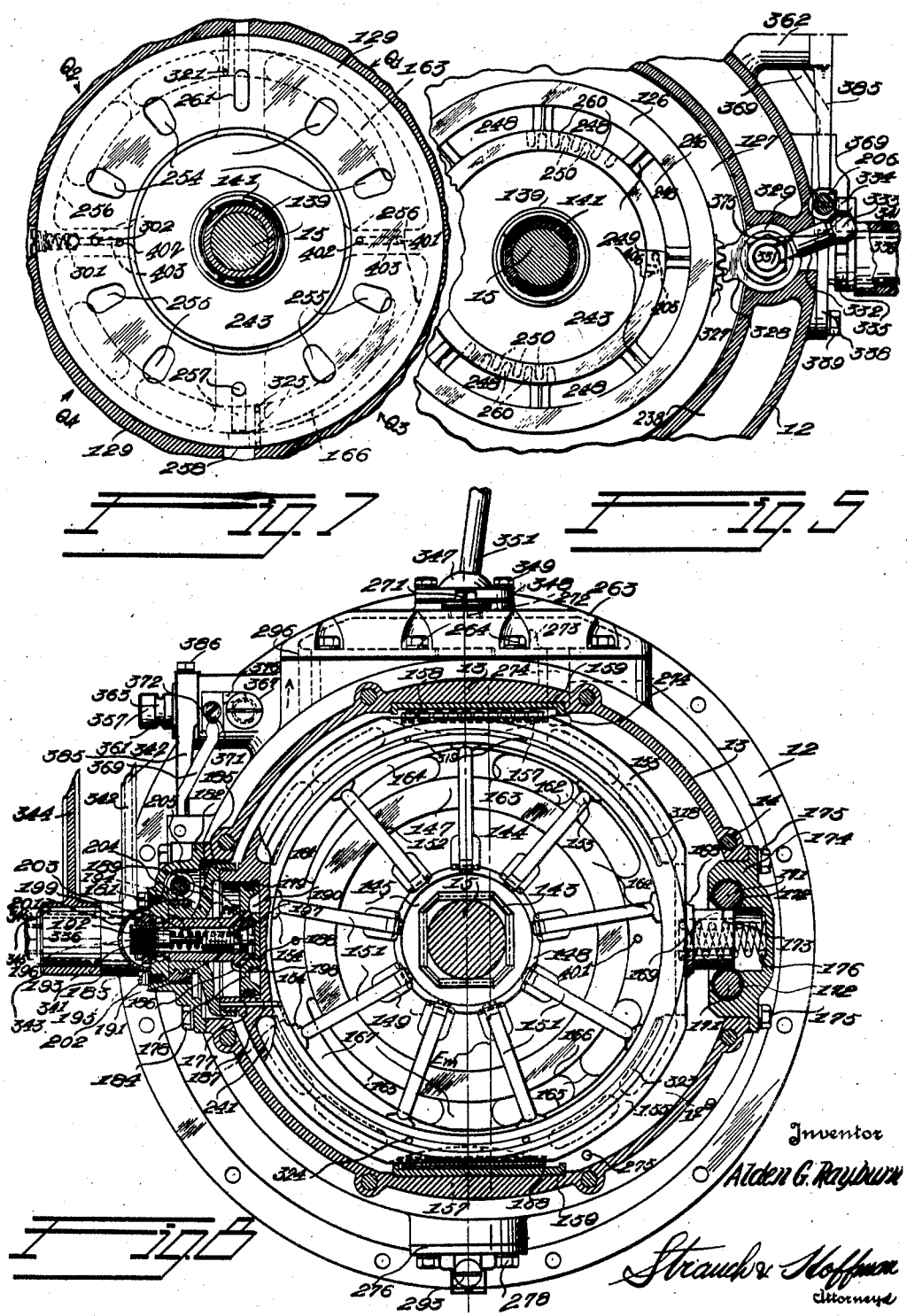

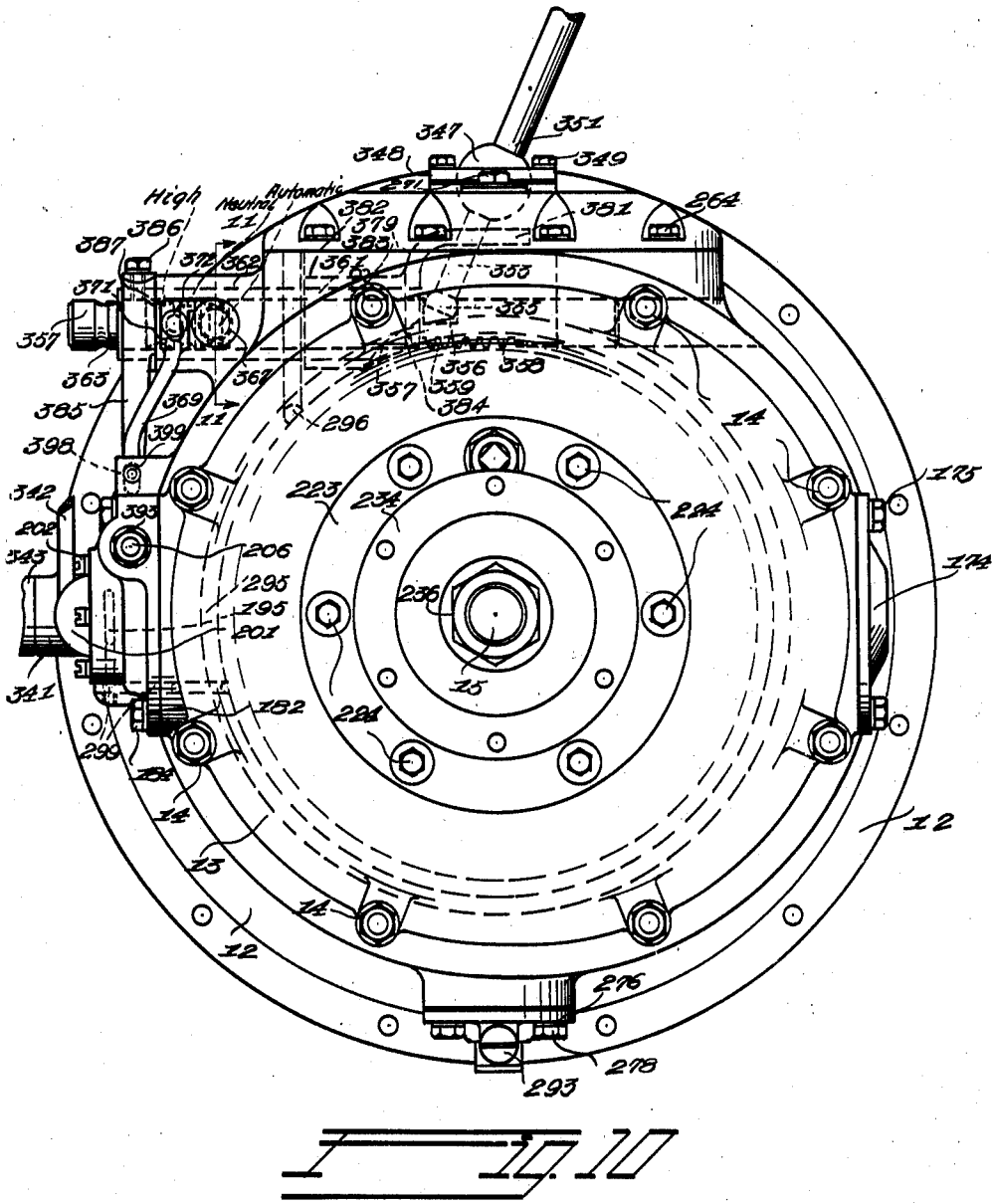

Patented Jan. 16, 1934

1,943,929

UNITED STATES PATENT OFFICE 1,943,929

ROTARY HYDRAULIC POWER TRANSMISSION

Alden G. Rayburn, Sausalito, Calif., assignor, by mesne assignments, to Automotive Engineering Corporation, a corporation of Delaware Application July 23, 1929. Serial No. 380,357

14 Claims. (Cl. 60—53)

The present invention relates to power transmitting apparatus and more particularly to hydraulic torque multiplying and speed changing power transmissions.

The preferred form of the invention hereinafter disclosed is of the type of transmission in which the maximum pumping occurs with maximum torque multiplication, and in which the fluid comes to rest when the mechanism is in direct couple or the driving and driven members are rotating substantially at the same speed. In the development of the preferred form of the invention special types of pump, motor, bearings and control arrangements have been devised, the principles of which are applicable in various relations independent of those hereinafter set forth, and it is to be understood that the use of such features in other relations is contemplated as within the scope of the present invention.

In hydraulic transmissions heretofore developed the most common forms utilize piston pumps and piston motors. Pumps and motors of the piston type, however, produce rapid reciprocations of the operating fluid. At the higher speeds, the fluid cannot follow the pump pistons so that failure of the pump to pick up fluid at higher speeds and agitation of the fluid causing foaming or emulsification occurs resulting in failure of operation at the higher speeds. The piston pump and motor types of hydraulic transmission accordingly are inherently limited to relatively low speed operation, and are generally not satisfactory for the transmission of power at more than approximately five or six hundred revolutions per minute.

To permit higher speed operation than has heretofore been feasible with the piston type pump and motor transmission, various forms of rotary pumps and motor mechanisms and combinations of rotary pumps with piston motors have been proposed most of which are impractical. I have heretofore devised transmissions involving combinations of rotary gear pumps with piston motors in which the fluid passes continuously in a single direction through the pump, eliminating the reciprocation of fluid in the pump. Because of the large bearings required in the reciprocating piston motors for this type of transmission and the driving reactions developed in order to multiply the torque satisfactorily the maximum safe operating speed for this type of transmission has been approximately 1500 revolutions per minute. The bearing cost and cost of construction are prohibitive for utilization of this type of transmission in usual automobile practice.

To meet the requirements of a transmission for use with modern high speed automobile engines, speeds in excess of 2500 revolutions per minute must be safely transmitted, while the cost of the construction must compare favorably with the cost of the comparatively low priced gear transmission at present in use in automobiles. I have devised novel mechanisms utilizing both rotary pumps and rotary motors, of special construction to meet the severe requirements of high speed automotive transmissions at comparatively low cost.

Accordingly a primary object of the present invention is to provide novel hydraulic transmissions of comparatively simple, rugged and low-cost construction, adapted for use with modern internal combustion automobile engines.

Another object of the invention is to provide novel and efficient rotary type pumps and motors adapted for high speed operation, and particularly adapted for use in hydraulic transmissions, but the principles of which are applicable in various other relations.

Still another object of the present invention is to provide hydraulic transmissions embodying novel automatic and manual control mechanisms.

A further object of the invention is to provide a novel motor construction, together with automatic or manual controls therefor, useful particularly in hydraulic transmissions, but the principles of which are applicable to other motors, to pumps, and in other relations.

Another object of the present invention is the provision of means for progressively decreasing the motor capacity with respect to the pump capacity as the speed of rotation of the tail or driven shaft increases, and a manual adjustment whereby upon reaching a predetermined speed the tail or driven shaft may be coupled directly with the prime mover and pump, with the hydraulic motor released from pressure.

Still another major object of this invention is the provision of novel rotor mechanism for rotary pumps and motors whereby pump or motor capacity (eccentricity) may be varied within wide ranges without the usual attendant damage to the blades and other parts and without scoring of the chambers by the blade tips.

A further object lies in the provision, for use in pumps and motors, of novel eccentricity-producing rings and special mountings therefor.

It is also an important object of my invention to arrange the elements of the transmission unit in such manner in relation to a hydraulic balancing means that they will be maintained in properly balanced and fluid sealing relationship. And in this connection it is a further object to balance the rotors by applying high and low pressure operating fluid against their faces at proper points.

Still another object is to provide a single and readily accessible micrometer adjustment by which the parts of the transmission unit may be drawn into proper floating and sealing engagement. It falls within the scope of this object to construct the adjusting mechanism in such manner that it will automatically take care of any slight changes in size of the parts, due to wear, expansion from heat, and the like.

A further object is to mount the driving elements of the pump and motor upon the driven or tail shaft in such manner that they shall be automatically maintained in proper radial relationship with the other respective pump and motor parts, thus eliminating the scoring and wearing of either set of parts.

Another major object lies in the provision of an automatic mechanism for use on the pump to obtain variation of pump capacity in accordance with changes in engine speed. Closely related to this object is that of providing an automatically adjustable device for maintaining the driven pump parts in proper balance by centrifugal action.

It is also an important object of my invention to so construct the pump and mount it in such relation to the engine flywheel that it provides a harmonic balancing arrangement to dampen torsional vibration of the engine shaft.

A further object is to arrange and port the valves of the transmission system in such fashion that substantially straight and unrestricted paths for the operating fluid will be provided between the pump and motor, thereby decreasing frictional losses and minimizing emulsification tendency of the fluid.

Another object of the present invention is to utilize a single valve floated between normally stationary surfaces, for controlling the flow of fluid to and from the motor.

It is also an object to include a clutch valve in the transmission unit which, when actuated, shall interconnect the high and low pressure sides of the operating fluid belt. In this connection it is an object of my invention to make the movement of the single control valve, as well as manual variation of the motor capacity, dependent to a certain extent upon prior manipulation of the clutch valve.

A further object resides in the provision of an auxiliary pump, housed within the transmission unit and operable thereby, for maintaining a circulation of lubricating oil and for returning spilled and leakage fluid to a unit filling reservoir.

Still another major object of this invention is to provide a simple and efficient system of control levers for the transmission unit, which levers shall be so arranged as to be within convenient reach for operation by the driver of the vehicle.

Other objects of the invention are such as may be attained by a utilization of the various combinations, sub-combinations and principles hereinafter set forth in the varied relations to which they are obviously applicable by those skilled in the art.

The invention will be best understood and further objects will appear from a study of the following detailed description taken in connection with the accompanying drawings, with the understanding, however, that the invention is not confined to any strict conformity with the showing in the drawings, but may be changed and modified as long as such changes and modifications mark no material departure from the salient features of the invention as expressed in the appended claims. In the said drawings:

Figure 1 is a vertical sectional view taken longitudinally through a preferred embodiment of my invention.

Figure 2 represents a vertical section taken on line 2—2 of Figure 1 with the pump blades rotated slightly from their position in Figure 1.

Figure 3 is a view in side elevation of the pump assembly.

Figure 4 is a sectional view as seen when looking upon the plane indicated by line 4—4 of Figure 1.

Figure 5 is a partial vertical section, showing the clutch plate and its control mechanism, as seen when viewing it in the direction of the arrows on line 5—5, Figure 1.

Figure 6 represents a sectional view showing the control valve as seen on the plane indicated by line 6—6, Figure 1.

Figure 7 is a vertical sectional view taken on line 7—7 of Figure 1.

Figure 8 is a vertical section through the motor and its housing, on line 8—8 of Figure 1 but with the rotor blades slightly rotated.

Figure 9 shows, in side elevation, my transmission unit disposed beneath the floor boards of an automotive vehicle.

Figure 10 represents a rear elevational view of the unit, with certain portions of the valve controlling mechanism shown in their concealed positions by broken lines.

Figure 11 is a detail sectional view taken on line 11—11 of Figure 10.

In the drawings briefly described above in which like reference characters designate like parts, the transmission mechanism is shown completely assembled in Figures 1, 9 and 10 and adapted to be mounted in any suitable manner between a source of power and a driven shaft, with its forward (left) end arranged to be driven from said power source and its rear (right) end adapted to transmit multiplied torques to said driven or take-off shaft. Although the unit, as shown, is disposed beneath the floorboards 11 of an automotive vehicle, it will readily be understood that it may be utilized in a great variety of analogous combinations. In this connection, it should also be understood that various features of construction and principles of operation of certain elements and arrangements thereof such, for example, as the pump, motor, valves, controls and adjustments, etcetera, may be used independently of the specific unit construction shown, either with or without modification.

The housing proper for the transmission mechanism is made up of two parts, a standard bell housing 12 and a rear housing 13 with their meeting open ends drawn together in fluid sealing relation by bolt and nut arrangement 14 as shown. The bell housing 12 is shaped to surround the pump and valve mechanism and the rear housing 13 to surround the motor and adjusting mechanism, all of which mechanisms have yet to be described. A single shaft 15 is supported centrally of housing 13 in a manner to be described later, and projects forwardly through bell housing 12.

As seen at the left end of Figure 1, a flywheel casing 16 has an annular flange 17 in aligned and cooperating engagement with the front face of a corresponding flange on bell housing 12. The crank shaft 18 of a combustion engine (not shown) is disposed centrally of casing 16 and in alignment with transmission shaft 15. A flywheel 19, preferably lighter in weight than that ordinarily used on a crank shaft of the diameter of shaft 18, is secured to an integral flange 21 on the latter by means of bolts 22 and nuts 23.

Centrally disposed within the flywheel is a pilot bearing 24 which receives the pilot head 25 of a bell-shaped guide and cap member 26. The transmission shaft 15 terminates adjacent the inner surface of bell-shaped member 26 and has a substantial portion of that end splined as at 27 to non-rotatably receive a sleeve 28. Said sleeve is provided with a pair of spaced shoulders 29 and 31 against which the inner races of ball bearings 32 and 33 respectively are held by means of locking nuts 34 and 35 respectively. A nut 36 is threaded upon the left end of shaft 15 and abuts the corresponding end of sleeve 28.

The outer race of ball bearing 32 is inclined as at 37, thus making it a side thrust as well as a radial bearing. Said outer race has its forward face drawn against the guide member 26 by means of the annular flange 38 of a driving and reactance member 39. This latter member houses bearing 32, surrounds the cylindrical periphery of guide member 26 with a close fit, and is held against the shoulder-forming flanges 41 of said guide member by means of bolts 42. Member 39 has external teeth 43 cut on its cylindrical periphery and these are designed to mesh with corresponding teeth 44 formed internally of a driving coupling 45, the latter being secured to the flywheel for rotation therewith by bolts 46. A pressed metal pan-shaped member 47 has its peripheral edge engaged with the end of bell housing 12 and is provided with a central opening 48 the circular edge of which terminates adjacent the teeth 43.

The crank shaft and flywheel, the pilot bearing 24, and the driving ring 45, described above, are all of conventional design and adapted to receive and actuate an ordinary mechanical clutch. Instead of equipping them with such a clutch and thereafter interposing the usual mechanical transmission, however, I utilize, by way of analogy, a flexible but non-slipping hydraulic clutch, a hydraulic motor for cooperating with said clutch to change speeds (multiply torques), and a positive acting fluid belt connecting said clutch with said motor.

A pump head 49 has an internal cylindrical surface which fits closely upon the corresponding surface of the flange 38 of driving and reactance member 39. The pump head is caused to rotate with said latter member by virtue of a key 51, and is provided with a pair of integral and rearwardly extending projections 52, one diametrically opposite the other. (See Figures 1, 2 and 3 for this and the following description).

A ring 53, of greater width than members 52, surrounds the latter members and forms an outer cylindrical housing for the pump. It is secured in position for rotation with the pump head 49 by screw bolts 54 which pass through its annular flange 55 into the projections 52. Mounted opposite the pump head 49 and spaced therefrom by projections 52 and the pump rotor (to be described shortly), is a ported valve 56 which has one side forming one of the pump walls. This valve 56 rotates upon ball bearing 33, fits slidably in the finished bore of ring 53 as shown, and is supported radially therein, four dowel pins 57 (see Figure 2) coupling it for rotation with the extensions 52.

With particular reference to Figures 1 and 2, a pump rotor 58 is radially mounted upon a square type universal joint for rotation with splined sleeve 28 and hence with shaft 15. The said joint comprises four enlarged portions 59 formed integral with the sleeve 28, arranged in two pairs normal to each other and with the outer surface of each portion 59 cylindrically curved about an axis perpendicular to that of the shaft. The curvatures of the surfaces of both portions of a pair must be equal and all four surfaces must have the same radius. The intersection of each enlarged portion with that adjacent thereto is shaped as at 60 to form a flattened corner. A special wearing strip 61 fits within the space between each portion 59 and the corresponding flat inner surface of the central portion 62 of the rotor. Each strip 61 is shaped on its under side to fit a cylindrical enlarged portion and at its outer side it is flat to permit planetary sliding movement on the corresponding flat rotor surface. The strips 61, as shown, are somewhat shorter than the flat rotor surfaces in order to permit the planetary movement just referred to. Thus if the rotor 58 oscillates together with one pair of strips, about one pair of the cylindrical portions 59, the other opposed pair of cylindrical portions is locked with respect to its wearing strips, but not locked with respect to the rotor because of said planetary sliding and oscillating movement of the strips with respect to the central rotor surfaces. This construction permits the rotor to float freely between the pump walls and to automatically prevent any rocking or cocking of the rotor with its consequent scoring of the pump walls which would otherwise result from such causes as deflection of shaft 15 and any minute disalignment of rotating parts. It should be observed that surface contacts are always maintained throughout this joint, whereas square joints heretofore known utilized only line and point contacts.

The rotor 58 has an outer ring portion 63 connected to its central ring portion 62 by a radial web 64, from which it results that annular pockets 65 are formed in the side faces of the rotor. A plurality of slots 66, preferably nine in number are equally spaced apart and radially disposed in portions 63 and 64 of the rotor. These slots are of substantially the same width as the rotor, terminate near the inner edge of the web portion 64, and accommodate the rectangular rotor blades 67 for radial reciprocation therein. Each inner corner of each blade 67, i. e., that portion which projects inwardly into a pocket 65, is mounted in a specially formed shoe 68, which shoe is slotted on its inner side to receive a portion of a metallic equalizing ring 70. That portion of each shoe that slidably or rollingly engages the periphery of ring 70 is curved as at 69. It will be observed that there are two rings 70, one disposed in each of the annular rotor pockets 65, and that all of the shoes are disposed in said pockets. The outer edges of the blades project through rotor portion 63 and are curved to provide semi-cylindrical tips 71 which seat in slippers 72. These slippers are thus capable of a limited oscillating or compensating movement on tips 71. They are preferably made wider at their outer surfaces than the thickness of the blades, and such outer surfaces are partially cylindrical about radii which are centered in the axis of shaft 15 when rings 70 are concentric with said shaft. The blade surfaces are provided with oil distributing grooves 80.

A floating control ring 73 of substantially the same width as the pump blades receives the rotor and blades with its cylindrical inner surface 74 slidably engaging the cylindrical outer surfaces of slippers 72 and thus forming the outer periphery of the pump chamber proper. This control ring is mounted and floated between diametrically opposite aligning plates 75, ball bearing pads 76, and hardened steel thrust plates 77. The plates 75 have cylindrical surfaces 78 (see Figure 1) which slidably engage corresponding surfaces on the control ring 73 to permit the latter to automatically adjust itself about its diameter that is horizontal in the position shown. In like manner the thrust plates 77 have their upper surfaces curved to slidably fit in cylindrical surfaces 79 on extensions 52, the axes of surfaces 79 being at right angles to those of surfaces 78. It will thus be seen that the ring is floated so as to be capable of a limited universal movement to automatically adjust itself when occasion demands, and that it is driven by the flywheel. The thrust plates 77 are slotted as at 81 to permit and to limit reciprocating movement of the bearing pads as the eccentricity of the ring is varied with respect to the shaft and rotor. In the position illustrated in Figure 2 the control ring has been carried as far as it can go to the right, bringing its vertical center line to the position of eccentricity indicated by line $E_p$, thus forcing the blades at the left side into their slots in the rotor and causing, by virtue of the equalizing rings 70, the blades at the right to assume distended positions. At this time the capacity of the pump is maximum. When the ring 73 is moved to the left until line $E_p$ coincides with the indicated vertical center line, it is concentric with the shaft 15 and the pump capacity is zero. Automatic variation of eccentricity is obtained in a manner later to be described.

It should be observed that the curved surfaces 69 of blade shoes 68 and the cylindrical blade tips 71 cooperate with the equalizing rings 70 in such manner as to compensate for the elliptical path the blades normally would pursue if held to a path about two centers. By this arrangement the slippers are caused to maintain approximate sliding clearance with the bore of the control ring 73 at all degrees of eccentricity.

The flywheel, members 39 and 49, valve 56, and all of the pump parts outside (radially) of the slippers 72, rotate as a unit in a counterclockwise direction (as viewed in Figure 2). Operating fluid, preferably oil, is fed at low pressure from valve 56 into the spaces 82 between blades at the upper side of the pump by way of passages 83 which terminate at the pump wall in a series of arcuately curved ports 84 (see also Figure 4). Directly opposite these ports, on the opposite face of the pump wall, a groove 85 is cut (see Figure 2) which corresponds in shape with said series of ports 84. The oil is discharged under high pressure from the spaces 86 between the lower blades, through a series of ports 87 (see also Figure 4) and corresponding passages 88 in valve 56. These ports 87 correspond in shape with upper ports 84, and a groove 89 is provided in the opposite pump wall, which groove corresponds in shape with upper groove 85. It should be observed that all of these specially shaped ports and grooves are inset from ring surface 74 to prevent any tendency of the slippers 72 to become damaged or dislocated. It should also be noted that the corresponding ends of grooves 85 and 89 are spaced at a greater distance than are the blades from each other. This must be done to prevent communication between the high and low pressure sides of the pump.

The control ring is provided (see right side of Figure 2) with a guide roller 91 mounted upon a pin 90 and situated at 90° from the bearing pad 76 and its associated mechanism. Roller 91 is supported in the extension 92 of a removable head 93, which head is attached to housing ring 53 by stud bolts 94. Two relatively heavy coil springs 95 are arranged to react against the outer ring 53 and the floating control ring 73, tending to force the latter toward the left. Each spring seats at one end in a depression in ring 73 and at the other end on a collar 96 carried on an extension 97 of a threaded bolt 98. A screw head 99 is provided on each bolt 98 to permit adjustment of the springs, and a nut 101 is employed to lock the bolt after adjustment.

Diametrically opposite the pin 90, control ring 73 is provided with an integral internally threaded socket 102 which houses an insert block 103. The latter has spiral square or acme threads on its interior to receive one end 104 of a double spiral rod 105. Threads 106 are formed on the rod of the same pitch as those on end 104, but reversed, and these threads are spirally journalled into a segment member 107 which is designed to counter-balance the weight of the pump parts as they move away from true center. Segment 107 has parallel babbited surfaces 108 which slidably support it between the pump head extensions 52. The rod 105 has an outer extension 109 upon which a ball bearing 111 is mounted and held in place by a nut 112. A retaining member 113, whose internal diameter is slightly greater than the outer diameter of bearing 111, is fitted between the latter and the pump housing ring 53. A cap 114, secured to the ring 53 by stud bolts in the same manner as cap 93, bears against the outer surfaces of bearing 111 and retainer 113. Metallic cups 115 are pressed into the counter-balancing segment on opposite sides of the spiral rod, and receive a pair of springs 116 which react between ring 53 and the segment tending to force the latter to the right. These springs are of substantially the same strength as springs 95 on the opposite side and are adjustable in the same manner by means of bolts 117 having extensions 118, collars 119, screw heads 121, and locking nuts 122.

It will be comprehended from the foregoing description that, when the flywheel is stopped or running at low speed, centrifugal force will not be high enough to overcome the springs 95 and 116 and hence the floating ring 73 will be held concentric with the shaft 15 and pump rotor, and the balancing segment 107 held inwardly spaced from the outer ring 53 with the cups 115 received in sockets 123 which provide stops or abutments on the floating ring. In such position the capacity of the pump is zero, no fluid being received or delivered. As a certain flywheel speed is attained, predetermined by the proportioning of the pump and its parts and the resistance of the springs, the floating ring travels towards the right while the segment 107 travels the same distance toward the left by virtue of the spiral rod connection, thus maintaining the pump in a substantially balanced condition. At this time the pump is operating, the flow of fluid depending upon the degree of eccentricity obtained. Eventually, when the flywheel speed becomes great enough, the pump reaches its maximum capacity position (illustrated in Figure 2), at which time the floating ring 73 abuts the stop members 124 on the right hand side, and the segment 107 is flush against the inner surface of housing ring 53 on the left hand side. Slots 125 are provided in the segment to permit the escape of any fluid between the segment and the ring 53 as the former flies outward.

The mass and disposition of the counter-balancing segment 107 is preferably so estimated as to exactly counter-balance the overbalance portions of the floating ring and rotor blades, plus the excessive weight of the operating fluid on the right hand side, at one predetermined speed. At other speeds, due to non-uniform variations in fluid masses in the spaces between the rotor blades, the counter-balancing arrangement, though satisfactory, necessarily varies somewhat from absolute perfection. For this reason I contemplate, in building large units, the substitution of a projecting cam or the like for the spiral threads which receive the threads 106 in segment 107, and the modification of threads 106 in such manner as to give them a non-uniform pitch. In this way the segment 107 may be made to move inwardly and outwardly at a greater or less speed than floating ring 73 at any particular speed of rotation.

As previously stated, valve 56 rotates with the flywheel, forms the inner pump wall or head, and distributes fluid to and from the pump. An adjustable clutch valve 126 floats between valve 56 and a manually operable control valve 127. Valves 126 and 127 have a spherical fit, as indicated at 128, to permit automatic adjustment and to prevent binding. Control valve 127 is maintained in position by contact with the vertical surface of a stationary valve 129 and by a journalled fit upon a hub portion of said valve 129, as indicated at 131. Valve 129 is secured to bell housing 12 by countersunk screws 132 and its periphery forms, as indicated at 133, a locating shoulder for rear housing 13. The detailed construction of the set of valves will be described later. Suffice it to say, for the present, that they may be relatively rotated to control the distribution of fluid between the pump and a motor. Shaft 15 is enlarged as at 134. A double thrust ball bearing 135 surrounds a portion of the shaft in abutting relation to this enlargement and is held in such position by nut 136. Ball bearing 135 is adapted, as shown, for radial load, and is housed within the hub portion of stationary valve 129. The latter valve is provided with a skirt extension 13 which has a flat face 138 against which a packing sleeve 139 is kept in sliding and sealing contact by means of a spring 141. The sleeve 139 has a dog type driving coupling 142 for connecting it for rotation with the splined sleeve 28.

Spaced from the rear face of stationary valve 129, a square universal joint 143, identical in construction with that used for mounting the pump rotor, is employed for fixing a motor rotor 144 upon shaft 15 for rotation therewith. (See also Figure 8). Rotor 144 comprises an annular wheel-forming portion 145, radially recessed as at 146 to reduce the mass thereof, and a rim or chamber-forming portion 147. An equalizing ring 148 surrounds the shaft at each side of the rotor for movement within the space formed by the wheel portion and the rim of the rotor. These rings slide in special shoes 149, which shoes are fitted on a plurality of radial blades 151, preferably nine in number. Blades 151 are adapted to reciprocate in slots 152 in the rotor rim, and their tips 153 carry slippers 154. The blade surfaces are provided with oil distributing grooves 160. A floating ring 155 of substantially the same width as the blades, is arranged to receive the rotor mechanism with its cylindrical inner surface 156 in sliding contact with the slippers 154. Floating ring 155 is supported for horizontal transverse movement by a pair of self-aligned bearing seats 157, bearing pads 158, and hardened steel thrust plates 159 which are held in the rear housing 13 by countersunk screws 161. It will now be seen that the motor rotor, floating ring, and the mounting of the latter are very similar to the same features as previously described in connection with the pump. It should be observed, however, that whereas the pump ring rotates, the motor ring does not, and that the motor is several times as large as the pump (though of substantially the same diameter) in order that driving torque may be multiplied in a manner to be hereinafter explained.

The stationary valve 129 forms the front head of the motor and is provided with a plurality of ports 162 which open into a specially shaped slot or groove 163 formed on the valve face adjacent the chambers 164 between the upper blade tips. In like manner a plurality of ports 165 open into a slot or groove 166 on the valve face formed adjacent the chambers 167 between the lower blades. The control valve 127 may be adjusted (as will later be set forth in detail) to deliver the high pressure pump fluid to the motor through either of the groups of ports 162 and 165, the motor thus being reversible. When the lower chambers 167 are under pressure and the upper chambers 164 are open to exhaust the motor is adapted to run in the same direction as the pump, at which time the vehicle is driven forwardly. The capacity of the motor varies, being zero when the floating ring is concentric with the shaft and rotor, (as illustrated), and reaching its maximum when the ring has been carried to the right until its vertical diameter coincides with the line of eccentricity indicated at $E_m$, Figure 8.

On its right side (see Figure 8), ring 155 rigidly carries a guide member 168 which latter has a hardened cylindrical extension 169 designed to roll on either of the rollers 171. Said rollers are journalled in anti-friction bushings 172 that are relieved as at 173 adjacent the extension 169 and supported in a cap 174. The cap, secured to housing 13 by bolts 175, provides a socket for the cylindrical extension 169 and for a heavy coil spring 176 that tends to force the ring towards its position of concentricity.

Diametrically opposite the guide 168, ring 155 is shaped to provide a movable cylinder 177,—movable because the ring itself is capable of transverse horizontal reciprocation. A piston 178 having a packing ring 179 is disposed in this cylinder in such manner that the circular piston and ring surfaces cooperate to form pressure abutments. A piston rod 181 is screwed into the piston at one end and has its other end projecting through a cap 182 and locked against longitudinal movement by a nut 183. Said other end is reduced in size, as shown, where it projects through the cap. This is done to permit a necessary slight lateral movement of the piston and rod when the ring 155 and cylinder 177 move slightly longitudinally of the shaft 15 to maintain the ring side walls in fluid sealing relationship (as will later be explained). Cap 182 is secured to housing 13 by bolts 184. Piston 178 is therefore immovable longitudinally. The cylinder assembly is completed by a head 185 which screws onto cylinder 177 and slidably engages rod 181 with a close fit, thereby forming a pressure chamber 186. This chamber 186 is connected with the lower motor chamber 167 at all times by way of a passage 187 in the ring 155. The piston rod is cylindrically hollow and has its bore connected with chamber 186 through a hole 188 and with an annular recess 190 on the inner face of the piston by way of a hole 189. A controlling piston valve 191, held in the inner end of the piston rod bore by a spring 192 and adjusting screw 193, is so designed and arranged with respect to holes 188 and 189 as to connect chamber 186 with recess 190 when motor chambers 167 are receiving a predetermined pressure from the pump during forward running. Piston valve 191 is partially hollow as indicated at 194, its bore opening at the left into that of the piston rod and thence communication with a circular groove 195 in the cap member 182 by way of radial holes 196 in the piston rod. Groove 195 is at atmospheric pressure (as will be shown later). Valve bore 194 communicates with a circular groove 197 on the valve surface via radial holes 198. When the pump pressure transmitted to chamber 186 exceeds a predetermined value it acts upon the right end of piston valve 191, forcing the latter toward the left against the spring tension until its right end passes hole 189 to permit the entrance of pressure fluid into recess 190. The effective area of the right face of piston 178 being greater than that of its left face, the cylinder 177 and hence the floating ring is forced toward the right a distance proportionate to the fluid pressure. This action causes blade eccentricity and the motor accordingly becomes operative. Should the fluid pressure then fall below that value necessary to overcome the tension of spring 192, the valve would assume a position with its groove 197 in alignment with hole 189, thereby exhausting chamber 190 to atmospheric pressure via the piston rod bore and groove 195 and permitting the heavy spring 176 to thrust the ring 155 back to its concentric position illustrated in Figure 8.

The predetermined pressure referred to above is obtained by adjusting the screw 193 to vary the spring tension. This is usually done when the unit is set up at the factory, but the adjustment may be altered by a skilled mechanic at such intervals as are made necessary by decreased power development of the prime mover with age, wear of parts, etc. A lock nut 199 secures screw 193 against rotation, and a readily removable closure cap 201 is fitted upon the end of the automatic device by means of cap screws 202.

To provide for manual, as well as automatic, shifting of the motor ring 155, the cylinder cover 185 has a spirally threaded extension 203 upon which a collar 204 is threadedly mounted for rotation. A circular rack bar 205, slidably mounted on an operating rod 206, is adapted, upon reciprocation, to rotate collar 204 and thus move cylinder cover 185 (see also Figures 9 and 10). A retaining thrust plate (Figure 8) prevents longitudinal movement of the collar. The means and method of operating rack bar 205 will be set forth later.

The construction at the rear of the motor (see especially Figure 1) will now be described. Just rearwardly of the motor, shaft 15 is enlarged to form a shoulder 207, against which a double ball bearing 208 is held by a nut 209. This bearing is designed for longitudinal as well as radial thrust, and is securely held within a bearing cage 211 by a packing nut 212. A leather collar 213 and resilient metal ring 214, secured to nut 212 by rivets 215, cooperate with nut 209 to seal the bearing and shaft assembly against the passage of oil. The bearing cage and packing nut are locked together by a cotter pin 216. The bearing cage 211 floats into the rear bore of the unit housing 13 and threadedly supports a reactance member 217 on the inner side of said housing. A head casting 218, slidably but non-rotatively supported between the motor thrust plates 159 and the reactance member 217, forms the rear head of the motor and has its forward face grooved as at 219 in the same manner as was the corresponding pump face. The reactance member is provided with a radial flange 221 which flange has an annular surface 222 bearing against the head casting 218, flange 221 having sufficient inherent resiliency to permit expansion of the elements of the transmission mechanism while maintaining them in a properly tight relationship.

A cap 223, fitted over the rear end of housing 13 and secured thereto by bolts 224, is designed at its upper side to receive a shaft 225 having a small pinion 226 formed on its inner end. This pinion is adapted to mesh with teeth 227 cut on the periphery of the bearing cage 211. The pinion shaft is journalled in a bearing 228 and is equipped with an adjusting head 229 and lock nut 231. This mechanism provides a single micrometer adjustment by which all running surfaces of the unit may be conveniently and quickly adjusted to their proper clearances at any time. For example, by loosening lock nut 231 and turning shaft head 229 to the right, the bearing cage 211 and reactance member 217 are caused to separate, the former being forced rearwardly and the latter forwardly; and since the shaft 15 must move with the bearing cage, it pulls all pump parts rearwardly while the motor parts move forwardly, thus reducing the running clearance throughout the machine.

The extreme rear end of shaft 15 is splined as at 232 to receive the hub 233 of a flanged driving coupling 234. Hub 233 projects through end cap 223 to hold a speedometer driving gear 235 in place and is locked against longitudinal movement by a nut 236 on the threaded end 237 of the shaft.

The bell housing 12 has cooling passages 238 (see Figures 1 and 5) formed therein for the circulation of water or the like, which may be drained by removing a plug 239. The ring 155 and the rear head 218 of the motor are cored out as at 241 and 242 respectively (see Figures 1 and 8) to reduce the mass of the unit and water may also be circulated through them if desired.

The valve details and the manner in which they control the flow of fluid between the pump and motor will now be set forth. Valves 56, 126, and 127 have their internal bores arranged to form a low-pressure chamber 243 (at atmospheric pressure as will be explained later), from which fluid is taken and centrifugally fed to the pump by the rotating passages 83 in the valve 56. As seen in Figure 4 there are three such passages 83 communicating with pump ports 84 and bridged apart by strengthening webs 244. The spaces marked 245 are merely corings for reducing the weight of and balancing the valve. The high pressure side of the pump communicates, by way of passages 88 in valve 56, with a pair of aligned 360° grooves 246 on the contacting surfaces of valves 56 and 126. Fluid flows from these passages 88, three in number and partially separated by webs 247, into the grooves 246 and thence into eight fore and aft passages 248 which extend all the way through clutch valve 126. The webs 249 (see Figure 5) which bridge passages 248 are of a special wedge shape, as shown, to promote direct fluid passage without permitting the rapid rotation of valve 56 and its webs 244 to cause frothing of the oil.

The operating fluid exits from passages 248 into an annular high pressure chamber 251 in the control valve 127. Since the motor is to be reversible and otherwise controlled at the will of the operator by adjustment of valve 127, the relation of valve 127 to the stationary valve 129 must be such that the connections of the high and low pressure chambers 251 and 243 respectively with the motor may be made, crossed or reversed at will. To this end, control valve 127 is provided with seven passages 252 between its rear face and the low pressure chamber 243, and with eight passages 253 between its rear face and high pressure chamber 251, all of said passages being separate and terminating on said rear face in a single annular space. Coincident with said annular space, stationary valve 129 is provided with a plurality of equally spaced ports, four of which are indicated at 254 (see also Figure 7) in the upper half and the other four of which are indicated at 255 in the lower half. Ports 254 open into two large cored chambers 256 which in turn communicate with upper motor chambers 164 by way of groove 163; and in like manner ports 255 open into a pair of cored chambers 256 which communicate with lower motor chambers 167 by way of groove 166. The ports 252 and 253 of valve 127 are so numbered and spaced that, upon rotating the valve to its various positions (see the running positions indicated by radial lines in Figure 6), the following results will be obtained:

In the position illustrated, that of "Forward automatic" (low) gear, the upper ports 253 are blanked off by the face of valve 129; the upper ports 252 are open to ports 254; the lower ports 252 are blanked off; and the lower ports 253 are in comunication with ports 255. This can best be visualized by folding Figure 7 over upon Figure 6 with the indicated quadrants, $Q_1$, $Q_2$, $Q_3$ and $Q_4$ of each in respective coincidence. It will readily be understood that in this position, with the prime mover accelerated, the automatic control cylinder at the left of Figure 8 will cause the motor to become operative, and the motor will rotate shaft 15 in the same direction as the flywheel. Upon rotating the valve 127 to its "Reverse" position the opposite conditions to those outlined above obtain, high pressure fluid being admitted to the upper side of the motor and low pressure fluid discharged at its lower side, from which it results that the shaft 15 rotates reversely. In "Reverse", however, the automatic control does not function because low instead of high pressure fluid is contained in passage 187 (Figure 8) and the motor must be manually controlled.

To place the transmission in "High" valve 127 is rotated to a position approximately half way between forward and reverse, at which time all of the high pressure ports 253 become blanked off and the two sets of ports 254 and 255 are brought into communication with low pressure ports 252. Since this places both sides of the motor under low pressure, the automatic motor control places the motor in its position of concentricity and zero capacity from which it results that a no-flow condition or hydraulic lock is obtained and the shaft 15 is driven at substantially flywheel speed directly by the pump.

In the first of the two positions marked "Neutral" ports 252 and 253 on the lower half of valve 127 are overlapped and brought into communication by ports 255 of valve 129. In the second of the "Neutral" positions, upper ports 252 and 253 are overlapped by ports 254 of valve 129. Hence in either "Neutral" location the high and low pressure chambers 251 and 243 respectively are short-circuited, thus shortening the operating fluid belt to exclude the motor therefrom.

Prior to each shift of the control valve 127 to any one of the aforedescribed positions it is highly desirable, though not absolutely necessary, to manipulate clutch valve 126 in such manner as to produce desirable pressure conditions throughout the set of valves and hence to balance them in a way to permit valve 127 to be easily shifted. For this purpose (see Figures 1 and 5) a set of equally spaced slots 250 are provided on the rear face of valve 126, and a similar set of equally spaced slots 260 are arranged on the front face of valve 127 in such relation to slots 250 that the series of slots alternate and do not interconnect when the clutch valve is in the normal position illustrated. They thus permit the high and low pressure chambers to be sealed from one another. However, upon rotating the clutch valve a predetermined distance counter-clockwise, Figure 5, slots 250 and 260 are caused to overlap each other and hence to bypass fluid between the high and low pressure chambers 251 and 243 respectively. The spacing of the slots is such that a proper bypass is obtained irrespective of the position to which the control valve 127 may be set, and it is for this same reason that the number of slots 260 is greater (as shown) than that of slots 250.

It should be observed that one of the high pressure ports 253 in the bottom of valve 127 is longer than the others. This is to permit high pressure fluid to be admitted at all times, regardless of valve position, to a drilled passage 257 (see Figure 1) that communicates with an opening 258 in bell housing 12. Opening 258 is provided for the insertion of a pressure gauge or the like (not shown) and is closed by a plug 259.

It should also be noted that one of the upper low pressure ports 252 has been made considerably longer than the others. This is done to maintain low pressure chamber 243 in communication at all times, irrespective of the position of valve 127, with an upwardly curved filling passage 261 in stationary valve 129. (See Figures 1 and 7). Passage 261 communicates with a reservoir 262 formed in the upper part of bell housing 12. A cap 263, secured to said housing by stud bolts 264, supports a valve cage 265 in a manner to suspend it into reservoir 262. A cup-shaped screen 266 is secured about the valve cage 265 by a ring 267 in such manner as to permit a poppet valve 268 normally to remain unseated with respect to the cage seat 269. A filler plug 271 closes the cap 263 and is vented as at 272. The weight of valve 268 normally maintains it open, thereby maintaining chamber 243 at atmospheric pressure and permitting the escape of any air entrapped in the system of the transmission unit. However, should the operating oil have a tendency at any time to surge or rush violently upward through passage 261, the poppet valve will be thrown upward against its seat to positively prevent any such undesirable action. The normal oil level is at a plane just above cage 265 in cap 263, but if it rises for any reason the excess oil will spill over a partition 273 (see figures 1 and 8) and thence pass downward, by way of a passage 274, into the compartment in housing 13 in which the motor operates. A drilled hole 275 through stationary valve 129 (see lower right corner of Figure 8) permits access of the overflown oil to that space in housing 12 which surrounds the pump.

Means are provided for returning all overflow leakage fluid from the pump compartment to the upper reservoir 262, as follows: An auxiliary pump body 276 having a hollow extension 277 is designed to fit into the bottom of bell housing 12 and to be secured thereto by bolts 278. A plunger 279 is mounted in said hollow extension and forced inwardly by a compression spring 281. The plunger carries a hardened steel runner 282 which contacts with an eccentric ring 283, mounted on the rotary valve 56 and secured thereto by cap screws 284. Hence, when the flywheel and pump walls rotate, ring 283 and spring 281 cause reciprocation of plunger 279. To permit such reciprocation a passage 285 is formed in the pump body to communicate centrally with the bore of extension 277 and to receive suction and discharge valves at its left and right ends respectively. The suction valve comprises a ball 286 controlling an opening 287 into the pump compartment and forced toward said opening by a spring 288 and threaded cap 289. The discharge valve comprises a ball 291 yieldably pressed toward the suction valve by a spring 292 and threaded cap 293, and controlling the communication between passage 285 and a drilled passage 294 in the bell housing 12. The discharge end of passage 294 terminates in an annular 360° recess 295, formed at that edge of the bell housing which fits into stationary valve 129. A passage 296, drilled in the upper side of the bell housing (see Figure 10) provides communication between annular recess 295 and the upper fluid reservoir. Any fluid leaking into rear end cap 223 is conducted to the suction side of the auxiliary pump by a passage 297 (see right side of Figure 1) and the hole 275 previously described.

The space formed internally of the motor rotor is connected to recess 295 by a pair of drillings 298. It was previously stated, during a description of the automatic control in Figure 8, that the groove 195 exhausted to atmospheric pressure. This is accomplished (see Figures 9 and 10) by means of a set of interconnected drilled passages 299 that connect groove 195 with annular recess 295.

A relief valve 301, (see Figure 7), similar in construction to the valves of the auxiliary pump, may be provided to obviate dangers resulting from accidentally developed excessive pressures. This valve may control communication between drilled passages 302 which connect the high pressure chamber 251 with the annular recess 295.

In addition to the manual micrometer adjustment 229, the transmission unit is equipped with an automatic hydraulic balancing device for maintaining the valves, and pump and motor parts in proper floating and fluid sealing relation. The pump head 49 (see Figure 1) has an annular chamber 303, within which an annular piston 304 is slidably fitted. The piston is sealed within the chamber by means of a leather trough-shaped washer 305, a steel ring 306, a plurality of coil springs 307, and a corresponding plurality of adjustable bolts 308. The bolts pass through the piston and packing assembly and thence through the reactance member 39 to be adjustably locked with respect to the latter by nuts 309. A passage 311 in the pump head 49 (see Figures 1 and 2) establishes communication between the delivery side of the pump and chamber 303, thus maintaining discharge pressure in the latter at all times. Normally such pressure is high and hence tends to force piston 304 and reactance member 39 forwardly while thrusting the pump, valves and motor toward the rear. As can be seen from Figure 1, the fluid pressure reacts between head 49 and piston 304, causing the head 49, the ring 53 and the valves 56, 126, 127 to move to the right into contact with stationary valve 129; and the piston 304 to move to shift reactance member 39 and the outer race of ball bearing 32, and hence shaft 15, to the left. This latter force is transmitted to the rear bearing 208 where it is transferred to the cage 211 and reactance member 221 at the surface 222 to cause the head casting 218 to floatingly engage ring 155 and force it into contact with the face of stationary valve 129. The motor rotor has a slight running clearance between the motor walls and hence is not detrimentally affected by the hydraulic balancing arrangement. The piston 304 is of an area so calculated that it will just overbalance all individual areas under pressure in the unit that would otherwise cause the various plates to break their sealing and floating relationship with one another. When the transmission is in "Neutral," or in other positions with the engine running at relatively low speeds, the pump pressure may provide insufficient reactance against the piston to maintain the proper seal but such seal is nevertheless provided as a result of centrifugal action causing the body of oil in the annular chamber to move outwardly with a strong tendency to separate the piston and its cylinder head, i.e., to increase the volumetric size of the annular chamber. In fact, this additional balancing feature is highly desirable and present under all operating conditions. It should be understood that a plurality of spaced cup-shaped chambers might be employed in lieu of the single annular chamber 303.

With reference now to Figures 1 and 2, the pump ring 73 is provided on its upper faces with balancing grooves 312 that communicate with each other through cross passages 313 and with the annular chamber 304 by way of a hole 314. Similarly, the lower faces of ring 73 are provided with grooves 315 that communicate through cross passages 316 but which, instead of being under high pressure from chamber 304 are connected with low pressure chamber 243 by way of interconnected drillings 317. These arrangements serve to counter-balance some of the unequal reactances which result when the pump chambers 86 are under pressure.

For similar reasons (see now Figures 1, 7 and 8) two grooves 318 on the flat ground upper surfaces of motor ring 155 are interconnected by drilled holes 319 and placed in communication with the front face of valve 129 by means of drilled passage 321. Due to the fact that valve 127 is rotated to change speed, passage 321 connects with a high pressure port 253 during forward running and with a low pressure port 252 when the transmission is in reverse. The particular high pressure port 253 (see Figure 6), unlike the others, is enlarged as at 322 to establish the necessary communication with passage 321 in the running position illustrated. Another pair of grooves 323 are located on the lower faces of ring 155 and interconnected by a passage 324; and a drilled passage 325 connects them, not with a high pressure port during forward running, but with a low pressure port 252. This particular low pressure port (see Figure 6) is enlarged as at 326 to make proper connection in the position illustrated.

The apparatus for manually operating the clutch and control valves and the motor ring 155, in accordance with the methods of control heretofore set forth, will now be described.

On its outer periphery (see Figure 5) clutch valve 126 is provided with a set of teeth 327 that mesh with an actuating segment 328. The latter is carried by a cylindrical plug 329 that fits snugly and rotatably in the wall of bell housing 12 and is held against longitudinal movement by a stud bolt 331. An operating pin 332 screws into plug 329 and has an operating head 333 slidably engaged in a forked portion 334 of a rotatable plate 335. This plate has an integral cylindrical extension 336 which is journalled on a horizontal shaft 337, the latter being carried by and secured to the bell housing by means of a plate 338 and stud bolts 339. The hub 341 of a conventional brake pedal 342 is freely mounted on extension 336 and adjacent thereto the hub 343 of a clutch pedal 344 is keyed upon said extension as at 345 (see Figs. 8 and 10). A nut and washer assembly 346 on the end of shaft 337 prevents longitudinal movement of the plate 335 and the pedal hubs. It should be observed that the clutch pedal is disposed at substantially the same point on the vehicle as is that for the ordinary mechanical clutch and that, as already explained, the pedal may be depressed before each shift to change speed in substantial accordance with the method of operation of present commercial vehicles.

The upper cap 263 for the fluid reservoir is shaped to provide a socket for receiving a spherical ball 347, which latter is rotatably held in the socket by a ring 348 and stud bolts 349. A conventional shifting lever 351 is rigidly carried by the upper side of the ball and projects upwardly through the floorboards into the usual position beside the driver to be conveniently grasped by him for manipulation. On its lower side the ball 347 carries an operating arm 353 that projects downwardly into a chamber 354 formed in the cap and bell housing. The lower end of arm 353 is specially shaped to form an actuating lug 355, which lug is elongated in a fore and aft direction and fits freely in a slot 356 in a circular cross control rod 357, (see Figures 1 and 10). Rod 357 is provided on its lower side with a set of teeth 358 certain of which mesh with a corresponding set of teeth 359 on the periphery of control valve 127. The control rod is mounted transversely of the unit to slide in a cylindrical sleeve 361 which latter is journalled in a horizontal extension 362 on the bell housing 12. It will thus be seen that as the operator shifts lever 351 to right or left its depending arm 353 reciprocates rod 357 to the left or right respectively and simultaneously oscillates valve 127 in a counter-clockwise or clockwise direction respectively. In the position illustrated, (shifting lever 351 being at extreme right), the control valve 127 is set for forward automatic operation of the unit, and by moving the shifting lever transversely of the unit toward the left, the control valve passes successively through its "Neutral", "High", and "Reverse" positions. These positions are indicated by peripheral grooves 363 on the control rod 357 (see Figure 10) and as the latter is reciprocated to any one of said positions it resiliently is latched against further movement as follows: The extension 362 has a receptacle 364 formed integral therewith, which receptacle houses a plunger 365 in such manner that the latter is pressed inwardly by a coil spring 366 which fits within the plunger and seats against a cap screw 367. (See also Figure 11). The inner end of the plunger is rounded as at 368 to be depressed into any one of the grooves 363 and to yieldingly ride out of the same upon the application of the necessary transverse force against shifting lever 351. In addition to this arrangement it is desirable to positively lock the transmission in each of its running positions in such manner that no shift can be made without first depressing the clutch pedal. To this end a link 369 is vertically arranged between the latch and clutch mechanisms, its upper end being slotted at 371 to permit vertical movement with respect to a guiding stud 372 and its lower end carrying a horizontal pin 373. This pin projects into a cam slot 374 in a plate 375 formed upon and transversely offset from the clutch plate 335, and hence is positively reciprocated vertically each time that the clutch pedal is actuated. The upper end of link 369 carries an integral latching lug 376 which is adapted to rise and fall in a slot 377 in the receptacle 364 and in a peripheral channel 378 on plunger 365. Therefore, when the end of said plunger is in engagement with one of the grooves 363 and the lug 376 is in the position indicated in Figures 9, 10 and 11, the control rod 357 is positively locked against reciprocation and can be released only by depressing the clutch pedal to lift link 369 by means of cam slot 374 and pin 373.

The shifting lever 351 is also adapted to accomplish a manual adjustment of the motor control ring 155 after the control rod has been latched in any of its positions in the manner above described. A clevis member 379 (see Figures 1 and 10) is disposed in the upper part of the bell housing. It has a forked extension 381 straddling the arm 353 adjacent the ball 347, and a sleeve portion 382 is fitted upon the inner end of sleeve 361 and for rotation therewith by a stud 383. Sleeve portion 382 and sleeve 361 are cut away as at 384 so as not to interfere with the movement of teeth 359 on the control valve 127. The fork 381 is arranged at right angles with the slot 356 in control rod 357 and hence the shifting lever 351 may be pushed fore and aft to rotate sleeve 361 without actuating the control rod in any way. Likewise the slot in fork 381 must be long enough to permit independent transverse movement of the shifting lever. For the same reasons sleeve 361 is cut away as at 380, (see Figure 11) for depression of latching plunger 365 and to permit proper rotation of the sleeve during such depression.

Attached to the outer end of sleeve 361 in splined relation thereto is a lever 385, held against longitudinal movement by a locking stud 386 that projects through its hub portion 387 into engagement with the sleeve. As previously described in connection with the automatic motor control mechanism, (see Figures 8 and 9), a rack bar 205 is slidably mounted upon an operating rod 206 the rack bar having circular teeth 388 which engage the teeth of a collar 204 to rotate the same upon reciprocation of said rack bar 205, thereby actuating and positioning the motor control ring 155 to vary the motor capacity. Reciprocation of the rack bar results from reciprocation of the operating rod 206 in the following manner: The forward end of rod 206 is slidably mounted in a stationary socket 389, and spaced from its forward end it is provided with a transverse slot 391 within which the ball shaped end 392 of the lever 385 is disposed. The rear end of rod 206 is equipped with nuts 393, properly adjusted and locked in position to engage the rear end of rack bar 205 during forward movement of rod 206. As illustrated, the latter and the rack bar are in their extreme rearward positions, at which time the collar 204 permits the automatic control mechanism to vary the motor capacity in the full range between zero and maximum capacity. As shifting lever 351 is manually thrust forwardly, however, thereby causing lever 385 to move rod 206 forward, the collar 204 is rotated to establish an eccentricity of ring 155 and thus maintain a motor capacity at a value above zero, dependent upon the distance that the shifting lever was moved. Since the construction and arrangement is such that the heavy spring 176 at the right of Figure 8 will have a tendency to return the ring 155 to concentricity and establish zero motor capacity when the operator releases the shifting lever, means are provided to prevent such return, as follows: Spaced ratchet teeth 394 are provided on the upper side of rod 206. The link 369 has, offset with respect to that portion which carries pin 373, (see Figure 9), an integral pawl 395 for cooperating with the ratchet teeth. This pawl is so spaced from the end of the link that it engages one of the ratchet teeth at the same time that latching lug 376 is down in slot 377 and groove 378 (see Figure 11). A fixed bracket 396 is mounted in the angle formed by link 369 and rod 206. A specially shaped screw 397 projects through a slot 398 in link 369 and is securely held by bracket 396; as by riveting its end 399. The slot 398 is vertically elongated to permit rising and falling movement of the link. A coil spring 400 is recessed in the link and retained therein by bracket 396 in such manner that its upper end reacts against screw 397 and its lower end reacts against the top of pawl 395, thus yieldingly thrusting the latter downwardly. With the apparatus in the position shown the shifting lever 351 may be pushed forwardly to move rod 206 to the left one notch at a time, reverse movement of the rod being prevented until such time as the clutch pedal may be depressed to lift pawl 395. It should be observed that cam slot 374 is so shaped that rod 206 cannot be moved during positions of partial depression of the clutch pedal, and that when the latter is fully up (as illustrated) the enlarged left end of the slot permits forward movement of said rod 206.

The ends of the special motor ports 163 and 166 are spaced from each other at a distance slightly greater than that between the tip of each blade 151 and the tip of the blade adjacent thereto. This must be done to prevent direct communication between the said special ports. With such an arrangement, when a pair of adjacent blades assume such a position that the space between them is in communication with neither of the special ports 163 and 166, it becomes virtually impossible to manually shift the ring 155 in a direction tending to decrease the volume of the incompressible operating fluid trapped between said pair of blades. To overcome this difficulty I provide means to release the trapped fluid into the low pressure chamber, as follows: A hole 401, of less diameter than the blade thickness, is made on the land between the corresponding ends of the special motor ports (see Figures 7 and 8) which hole 401 communicates with a similar hole 402 on the forward side of stationary valve 129 by way of a passage 403 in a web of the valve. Hole 402, with the parts in assembled position, feeds into a circular groove 404 on the adjacent surface of the controlling valve 127 (see Figure 6). Groove 404 is made long enough to maintain communication with hole 402 in any and all positions of valve 127, and the groove is connected to the opposite face of valve 127 by a third hole 405. This latter hole is normally sealed or closed by the adjacent surface of clutch valve 126, but when the latter is rotated by depressing the clutch pedal, a slot 406 in the clutch valve (see Figure 5) is carried into overlapping relation to hole 405, placing the latter into communication with the low pressure chamber 243. Hence it will be seen that the clutch pedal may be depressed to permit manual shifting of ring 155 regardless of the position of the motor blades. While only one set of ports and passages has been described it will be observed that there is a set shown at each side of the device in the drawings.

*Operation and other important features*

The plug 271 is removed from the cap 263 and fluid, preferably a medium grade of engine lubricating oil, is poured into the interior of cap 263 from where it flows past the valve 268, through screen 266 into the reservoir 262, thence through the passage 261 and passages 252 into the central low pressure chamber 243. When this chamber is filled it passes forwardly through the passage way 83 in valve 56 into the pump chambers 82. By rotating the pump head 49 so as to extend the blades slightly the fluid is passed by means of the pump blades into the chamber 86, then into the passages 88 and the 360° groove 246 and thence on through ports 248 into the annular high pressure chamber 251. Passing from chamber 251 fluid goes through the ports 253 and the ports 255 which register therewith, into the two lower chambers 256 shown in dotted lines. When these chambers are filled the fluid passes into and fills the motor chambers 167. Fluid also passes through the drilling 187 into the control cylinder 177. A plug, not shown, but located near the top of the cylinder head is removed and all air displaced. When the cylinder has been filled with fluid the plug is replaced. As the rotor is turned the filled pockets pass into register with chambers 164 and fill them up, the air being displaced due to the fact that these chambers are kept open to atmosphere when valve 127 is set for forward running of the transmission. The fluid now flows into and fills the two upper chambers 256 and then passes into the central low pressure chamber 243 and thence back on up through the passage way 261 through the poppet valve 268 into the cap 263 and spills over the partition 273. It then falls through the passageway 274 into the interior of casing 13. From here it is conveyed through the drilled hole 275 into the outer compartment of the pump and it is then picked up by the auxiliary pump and forced through the passageway 294 into the annular recess 295. Thence it passes through the drillings 298 into the interior of the motor rotor assembly and after filling this space, it flows up through the pass 296 into the cap 263. This completes the filling of the mechanism and most of the air has been displaced ahead of the fluid as it filled the passageways, due to the construction of the device. Once the transmission is filled the only new fluid required is that which actuatlly gets out of the transmission, through some possible defect in manufacture, onto the road. A periodical inspection of the oil level in cap 263 is all that is necessary, and replenishment of oil to return the level to proper height if found low. The fluid in the system acts like an endless belt and moves between the pump and motor only when in gear reduction.

The transmission is now ready for actual operation in the vehicle. The operator starts his engine and the pump housing is rotated with the flywheel with practically no tendency to turn the shaft 15 since the rotor blades 67 and slippers 72 are sliding in the bore of the ring 73 which is concentric with the rotor when starting and no fluid is moved. As a result, regardless of how cold the fluid may be when starting the engine, only a small additional load is put on the electric starter. As the engine reaches a speed of 300 to 400 R. P. M. the springs 95 and 116 are caused to compress due to centrifugal force acting on ring 73 and counter-balancing segment 107. The pump blades are caused to extend slightly more on the right side of the rotor than on the left and fluid is picked up from chambers 82 and forced into chambers 86. As oil is virtually incompressible any movement under pressure of the oil from the pump causes the oil in all the passageways connecting between the pump chambers 86 and the motor chambers 167 to be under pressure. This causes pressure to be transmitted to the control piston chamber 186 and the control valve 191 (Figure 8). As the pressure is increased a tendency for the engine to drive the shaft 15 and the rear wheels of the vehicle by direct pump reaction and drag takes place but, as actual torque multiplication is required beyond that which the engine can deliver when directly coupled to shaft 15, the pressure builds up to a predetermined point which causes the valve 191 to uncover the passage 189 so that oil is allowed to pass the valve head. This action allows high pressure fluid to pass into chamber 190 and, since this chamber has a larger area than chamber 186, the differential pressure forces ring 155 to the right a distance dependent upon the torque requirements. As the ring 155 moves to the right it causes the blades 151 to extend proportionately on the right side of the rotor to present a larger blade area to the pressure in chamber 167 than is presented on the left side of the rotor. Immediately the pressure re-acts, between the ring 155 and the blades of the rotor extended, and causes the rotor to exert an additional turning effort on the shaft 15 in the same direction the engine is turning the pump parts. It can be seen that the amount of additional torque available for acceleration is dependent upon the blade area, the pressure per sq. in. and the distance from the center of shaft 15 that the pressure is exerted. Now as the blades move off of the land between the sets of chambers 164 and 167 the oil is released to atmospheric pressure and returned to the intake side of the pump where it is fed in again by centrifugal force to be forced by the pump through the same cycle of action. As the vehicle is accelerated and the torque requirements become less while the speed requirement becomes greater, the control piston valve 191 moves to the right and releases the pressure from the chamber 190 and the housing ring 155 is forced to the left decreasing the additional torque until it balances with the requirements. The blades in the rotor are thus caused to present less area and thus produce less additional torque and also take less oil flow from the pump, but the speed increases due to the fact that the pump housing and the rotor now travel at a less difference in speed. As the engine speed increases from 1000 to 1200 R. P. M. centrifugal force causes the pump blades to extend their greatest and the motor blades 151 and ring 155 become concentric with shaft 15. As the motor cannot in this condition receive any fluid the pump is no longer able to deliver its full capacity to the motor and the fluid back pressures cause the pump housing and rotor to be hydraulically locked together and all engine torque is transmitted through this rotor directly to the shaft 15. This is the position illustrated in the drawings. At this point if desired the valve 127 may be rotated to "High" position and the pressure which exists in the motor chambers 167 released, the high pressure now being cut off by the valve 127 instead of the rotor blades in the motor and both sets of motor chambers being under low pressure. This makes a highly efficient direct drive as it eliminates all leakage that might otherwise result from high pressure in the motor parts and also the excess loads on the bearings 135 and 208. This also gives the oil a chance to cool in the motor on long runs in direct couple. It will be seen that the pump now functions as an efficient and flexible hydraulic clutch when no torque is required above what the engine can deliver.

If an instantaneous neutral is desired for coasting or other reasons, the engine is allowed to idle and the clutch pedal depressed to rotate control sleeve 343 and hence valve 126 to bring the by-pass slots 250 and 260 into register, thus causing the pressure in the pump to be released to atmosphere. The springs 95 and 116 then force the pump parts into concentricity and zero capacity. It can be seen with the pump rotor and ring concentric that no fluid is moved between the units and the transmission is free to coast with a minimum of resistance.

To obtain a brake condition it is only necessary to push lever 351 forward, this movement causing the lever 385 to move the rod 206 to the left. This causes the pawl 395 to move vertically and then snap into each of the ratchet teeth 394 as it passes, thus preventing the shaft from going back. The rod 206 pulls the rack 305 to the left and causes the collar 204 to rotate, thereby forcing the housing ring 155 to the right. This causes the motor to become a pump and oil is forced from it toward the pump proper. Now, as the speed of the pump proper has been increased by the engine throttle to about 800 or 900 R. P. M., its blades are extended and it becomes a motor, driving the pump head 49 and the engine faster than shaft 15, dependent upon the amount of eccentricity given the motor and the amount of braking effect required.

Another important feature of this transmission is that, if the vehicle is forced to stop on the side of a hill, the operator has but to allow his engine to idle, thus putting his pump in neutral, and to push lever 351 forward to its extreme position. The vehicle now cannot back due to motor capacity being great and the pump capacity zero. As the operator speeds his engine up the pump causes fluid to be forced into the motor and the vehicle moves on up the hill, after which the operator releases lever 351 to permit subsequent automatic control of gear reduction. This is an exceptional and safe feature in contrast to the present dangerous and unsatisfactory method of allowing the vehicle load to be picked up by a slipping clutch during a simultaneous releasing of brakes.

Reverse is accomplished by depressing the clutch pedal and moving lever 351 sidewise to the left to rotate control valve 127 and then forward to give ring 155 its maximum eccentricity. This causes the motor to present its greatest capacity and the control valve to place the high pressure into the upper chambers 164 instead of the lower chambers 167 and connects chambers 167 to atmosphere (suction side of the pump). By increasing the engine speed from idling after letting the clutch in, the pump causes oil to be forced into the motor, revolving the motor in the opposite direction in a ratio dependent upon the speed of the pump. In reverse the automatic control does not function in this design and the capacity of the motor is controlled manually, this being preferable because it is seldom desirable to run a vehicle backwards at high speeds.

The hydraulic transmission unit of this invention is compact and cheap to manufacture. It is designed to take standard anti-friction bearings of present day commercial sizes. It will compare favorably in size, weight and cost with the mechanical transmission sets now on the market and has the advantages over them that it is substantially noiseless, that no horsepower developed by the prime mover is lost through a slipping clutch and that its maximum torque multiplication, and hence its maximum speed reduction, is theoretically infinite. It has other advantages over the mechanical transmission, as well as over prior hydraulic transmissions operating on similar principles, some of which advantages have already been brought out and others of which will now be discussed.

When the vehicle is standing or coasting without braking effect, and the engine is idling or running at comparatively low speed, since the pump is automatically maintained in concentric (zero capacity) position at such times, there is absolutely no flow of fluid. This eliminates much wear and leakage, and gives the operating oil an opportunity to cool. Although torque multiplication is automatic according to acceleration demands, the operator may shift into "High" during distance runs, at which time a direct hydraulic lock between the pump and shaft 15 is obtained, with no fluid flow and with low pressure on both sides of the motor. This arrangement also avoids wear and leakage and permits the oil in the motor to become cooled.

When in neutral position with the clutch pedal depressed to overlap slots 250 and 260, the drag will substantially prevent racing of the engine. This feature obviates damage that might otherwise be done by a novice or a careless driver.

It will be observed that the pump bearings are lubricated centrally from the low pressure chamber 243 and hence that the lubricant does not have to oppose centrifugal force while traveling to the bearings. This central arrangement of chamber 243 also obviates, by centrifugal force when starting, the entrance of air and consequent emulsification of the oil.

This unit is so designed that there is but one single revolving joint where there might be a possibility of leakage of oil through centrifugal force, viz, that between valves 56 and 126. Even here, however, the possibility is but slight, due to the valve faces, being perfectly matched and the valve 126 having a universal seat on valve 127. Due to this same arrangement and to the fact that the contracting areas of rotating valve 56 and stationary valve 126 are small, no excessive friction will be developed to cause trouble during starting of the engine.

Whereas the valves might have been made up and arranged to cooperate with a large stationary ported casting, I find it advantageous to form and arrange them separately, and to eliminate said large casting thereby lightening and simplifying the construction, making them easily removably and replaceable, and providing short, substantially straight passages between the pump and motor. In furtherance of the latter feature, to prevent restriction and consequent frothing of the oil, four large capacity chambers 256 are provided in the stationary valve 129 and these communicate directly and transversely with the motor by way of slots 163 and 166.

Since all of the pump elements except the rotor and its blades are positively driven by and with the flywheel, it may be said that they actually form a part of the latter. For this reason the flywheel proper may be made much smaller than one that would ordinarily be required for the particular prime mover, and the weight and installation cost of my hydraulic unit is accordingly reduced. Of as great, if not greater, importance, however, is the fact that the weight reduction of the flywheel proper and the action of the hydraulic pump each produce a highly desirable dampening of the torsional vibration of the crank shaft of the combustion engine. The vibration to which I refer is that set up by the flywheel as its inertia tends to cause it to lag behind the crankshaft during each explosion stroke of the engine and immediately thereafter to twist the shaft in an attempt to run ahead of it. Various attempts have been made to remedy this by mounting harmonic torque balancers such, for example, as the "Lanchester" balancer, upon the forward end of the crank shaft and, in some instances, by using specially constructed crank shafts. However, as a result of this invention, the expense and inconvenience of these prior arrangements is avoided and a more satisfactory balancer is provided. The effective weight of the flywheel proper is reduced and, although the total flywheel weight is made up by the addition of the rotating pump parts (auxiliary flywheel), the latter are mounted to the rear of the flywheel proper and have their effective inertia variable in such manner as to rapidly change the total effective flywheel inertia to keep the periodic acceleration and deceleration of the flywheel proper out of phase with the periodic shaft flexures which result from explosive forces. This attainment is realized because the automatic device incorporated in my pump is extremely sensitive and responsive to increments in flywheel speed, the ring 73, balancing segment 107, pump blades and tips and a small amount of oil, moving in and out with respect to shaft 15 upon, and to compensate for, each vibration-producing pair of accelerations and decelerations of the flywheel proper. Also the sudden increments in flywheel speed cause the ring 73 to tend to slip suddenly with respect to the rotor and blades and hence to mitigate the torsion and flexure of the engine shaft. This slip is permitted because in each instance a vacuum-producing suction is created on one side of the pump and a crowding of fluid, under a pressure slightly greater than normal high pressure, takes place on the other side of the pump. This helps to eliminate torsional vibration because the periodic slips and pressure fluctuations are necessarily somewhat out of synchronism with the original engine explosions that produce them. In this connection it should be observed that no energy is wasted in my hydraulic dampener as is the case with the mechanical balancers now in use. I wish it to be understood that I may, in some instances, convert my pump into a hydraulic clutch independent of a hydraulic transmission, and use it in combination with a mechanical transmission unit.

Having described certain preferred embodiments only of my invention, what is desired to be secured by Letters Patent and claimed as new is:

1. A torque multiplying hydraulic transmission unit comprising a stationary housing; driving means; driven means; a pump actuated by said driving means; a variable capacity rotary motor for rotating said driven means; said motor embodying a rotatable element connected to said driven means and a non-rotatable complemental element operatively associated therewith; means for relatively adjusting said motor elements to vary the motor capacity, comprising diametrically opposed anti-friction members universally mounted between said non-rotatable element and the housing, and pressure-responsive mechanism mounted between said non-rotatable element and said housing intermediate the said anti-friction members; means for distributing fluid between said pump and said motor; and means for admitting fluid from one side of said motor into said pressure-responsive mechanism.

2. A torque multiplying hydraulic transmission unit comprising a driving member; a driven member; a variable capacity pump embodying an element actuated by and automatically adjustable in response to the speed of said driving member, and a complemental element operatively connected to said driven member; a motor for driving said driven member; and means for controlling the distribution of fluid between said pump and said motor.

3. A torque multiplying transmission apparatus embodying a driving member; a driven member; a variable capacity pump comprising an element operatively connected to said driven member and a complemental element actuated by said driving member and movable relative thereto to vary the pump capacity, said complemental element being unbalanced in mass with respect to said other element and said driven member and therefore movable in response to variations in speed of the driving member; a counterbalancing mechanism connected with said complemental element to compensate for the unbalanced forces set up during actuation of the latter; a fluid motor for driving said driven member; and means for distributing fluid between said pump and said motor.

4. A torque multiplying hydraulic transmission unit comprising driving means; driven means; a fluid pump actuated by the relative rotation of said driving and driven means; a fluid motor for driving said driven means when fluid is delivered therethrough by said pump; a valve system forming high and low pressure paths for the distribution of fluid between the pump and the motor; said system including an adjustable control valve and an adjustable clutch valve having one of its faces in floating engagement with said control valve, and cooperating ports in said valves for establishing a by-pass relation between the said high and low pressure fluid paths at the will of the operator; and means for manually controlling each of said valves.

5. In a hydraulic transmission unit, a driving reactance assembly; a shaft extending longitudinally of the unit; a thrust bearing secured on one end of the shaft against longitudinal movement with respect thereto and received in said reactance assembly; another thrust bearing secured against longitudinal movement upon the opposite end of said shaft; a second reactance assembly receiving said other thrust bearing; a hydraulic transmission system mounted upon said shaft between said reactance assemblies; and means for manually adjusting the distance between said reactance assemblies.

6. In a hydraulic transmission unit, a pump; means for driving said pump; a motor; means driven by said motor; a valve system for controlling the distribution of fluid between said pump and said motor; said valve system including a control valve and a clutch valve; separate means conveniently mounted upon said unit for manipulation of said clutch and control valves; and means rendering the manipulation of said control valve dependent upon prior manipulation of said clutch valve.

7. In a hydraulic transmission unit, a pump; means for driving the pump; a motor; means driven by said motor; a valve system for controlling the distribution of fluid between said pump and said motor; said valve system including a clutch valve; manually operable means for adjusting the relative fluid capacities of said pump and said motor; a manipulating device operatively connected to said manually operable means; and latching means interconnecting said clutch valve with said manipulating device to render the operation of the latter dependent upon the position of the former.

8. In a hydraulic transmission unit, driving means; driven means; a pump actuated by said driving means and a motor for actuating said driven means; a valve system, including a clutch valve and a control valve, for controlling the flow and distribution of fluid between said pump and said motor; manually operable means for adjusting the relative fluid capacities of said motor and said pump; means for actuating said clutch valve; a single manipulating device having a two-way movement for actuating said control valve and said manually operable means respectively; and latching means inter-connecting said manipulating device with said clutch actuating means, said latching means including automatic mechanism rendering operation of the manipulating device dependent upon the position of said clutch actuating means.

9. In combination with the crank shaft of a combustion engine, a flywheel; a driven shaft; power transmitting means between said flywheel and said driven shaft; said transmitting means including a hydraulic harmonic balancer automatically adjustable in response to variations in speed for dampening the torsional vibrations of said crank shaft.

10. In a hydraulic transmission apparatus, a driving member and a fluid pump actuated thereby; a fluid motor substantially aligned with and spaced from said pump; a shaft driven by said motor; and fluid distributing means disposed in the space between said pump and said motor, said means comprising a pair of valve members substantially concentric relative to the axis of the transmission and provided with surfaces in universal contact, said pair of valve members comprising normally stationary clutch and control valves respectively, shiftable relative to each other.

11. In a hydraulic transmission apparatus, a driving member and a driven shaft; a fluid pump actuated by said member and a fluid motor for driving said shaft; means for distributing fluid between said pump and said motor; said pump having a pumping element connected to said driving member and automatically shiftable in response to the speed of the latter to vary the pump capacity, said shiftable element being movable radially by centrifugal action and thus tending to unbalance the rotative masses of the pump and there being a counter-balancing device shiftable radially to oppose and substantially compensate for said unbalancing tendency.

12. In a hydraulic speed-change apparatus, a driving member and a driven member; a fluid pump comprising complemental rotatable pumping portions secured to said respective members to be actuated thereby; one of said pump portions being automatically shiftable, in response to the speed of the member to which it is secured, to vary the pump capacity; and means for controlling the circulation of fluid through said pump.

13. In combination with the crank shaft and flywheel of a combustion engine; a driven shaft; and power transmitting means between said flywheel and said driven shaft; said transmitting means including a hydraulic harmonic balancer for dampening the crank shaft vibrations; said hydraulic balancer having a portion thereof driven by said flywheel and forming in effect a part of the total flywheel mass, and automatically operable in response to speed changes to vary the total effective flywheel mass.

14. A hydraulic transmission unit comprising driving means and a fluid pump actuated thereby; driven means and a fluid motor for driving the same; a valve system forming high and low pressure paths for the distribution of fluid between the pump and the motor; said system including an adjustable control valve and an adjustable clutch valve having one of its faces in floating engagement with said control valve, and cooperating ports in said valves for establishing a by-pass relation between the said high and low pressure fluid paths at the will of the operator.

ALDEN G. RAYBURN.